US005116666A

United States Patent [19]

Konno

[11] Patent Number: 5,116,666

[45] Date of Patent: May 26, 1992

[54] ELECTROSTATIC RECORDING FILM

[75] Inventor: Takeshi Konno, Shizuoka, Japan

[73] Assignee: Fuji Photo Film Co., Ltd., Kanagawa, Japan

[21] Appl. No.: 555,694

[22] Filed: Jul. 23, 1990

[30] Foreign Application Priority Data

Jul. 21, 1989 [JP] Japan ................................ 1-189041

[51] Int. Cl.[5] ............................................ B32B 9/00

[52] U.S. Cl. .................................. 428/220; 428/323; 428/328; 428/331; 428/332; 428/537.5; 428/913

[58] Field of Search ............... 428/195, 209, 211, 323, 428/328, 331, 537.5, 913, 220, 332

[56] References Cited

U.S. PATENT DOCUMENTS 3,997,343 12/1976 Weigl et al. ......................... 428/414
4,792,485 12/1988 Konno ............................... 428/211

FOREIGN PATENT DOCUMENTS 57-012144 3/1982 Japan .
57-101841 6/1982 Japan .
61-213851 9/1986 Japan .

*Primary Examiner*—Patrick J. Ryan
*Attorney, Agent, or Firm*—Sughrue, Mion, Zinn, Macpeak & Seas

[57] ABSTRACT

An electrostatic recording film comprising a insulating film, a conductive layer and a dielectric layer laminated in this order, wherein said dielectric layer consisting essentially of a polymer binder, insulating grains and conductive powders and said conductive powders are fibrous conductive powders, is disclosed. The electrostatic recording film of the present invention makes it possible to give a clear and sharp image suffering from little line cutout or spotting.

5 Claims, No Drawings

ELECTROSTATIC RECORDING FILM

FIELD OF THE INVENTION

This invention relates to an electrostatic recording film for directly converting an electrical signal into an electrostatic latent image. More particularly, it relates to an electrostatic recording film which gives a clear image suffering from little line cutout or spotting.

BACKGROUND OF THE INVENTION

A known electrostatic recording film consists of an insulating film, a conductive layer and a dielectric layer which are laminated in this order. An electrostatic recording system comprises applying a recording voltage to a multipin electrode head (hereinafter simply called a "pin electrode"), inducing arc discharge within a fine void (hereinafter simply called a "gap") between the pin electrode and the dielectric layer of an electrostatic recording film to thereby form an electrostatic latent image and then developing the electrostatic latent image with the use of a toner so as to give a visible image.

In order to obtain a clear image, it is required to control the gap within an appropriate range based on Paschen's curve. The most common method for achieving the above-mentioned object comprises contacting a dielectric layer, to which insulating grains have been added so as to give an appropriately uneven surface, with a pin electrode to thereby appropriately control the gap. In the case of the above-mentioned electrostatic recording film, however, a clear image can never be obtained unless insulating grains are added to the dielectric layer. On the other hand, it is known that incomplete grounding of the dielectric layer would cause "fog".

In the case of a conventional electrostatic recording paper, grounding from the paper side of a conductive paper is possible. In the case of an electrostatic recording film comprising an insulating film, however, it is impossible to ground from the both sides of the insulating film. Therefore it has been attempted to expose some part (usually an end) of the conductive layer or to apply a conductive coating such as a carbon coating onto the exposed part to thereby form a grounding electrode. In these cases, however, an additional process for exposing the conductive layer corresponding to the width of each product or for applying the conductive coating is required, which would lower the production efficiency.

Therefore JP-B-57-12144 proposes an electrostatic recording film wherein a conductive grains are dispersed in a dielectric layer in such a manner that these conductive grains are come in contact with each other when a pressure of a definite level or above is applied, thus giving conductivity. (The term "JP-B" as used herein means an "examined Japanese patent publication".) According to JP-B-57-12144, the electrostatic recording film is charged with a pin electrode (pressure: 50 to 100 g/cm$^2$) and then pressed with a conductive roll (pressure: 500 to 5000 g/cm$^2$) prior to the development. Thus the conductive grains dispersed in the dielectric layer are come in contact with each other so as to keep the dielectric layer as to serve as a grounding electrode, thus solving the problem of fog.

Although such an electrostatic recording film shows no fog, a large amount of conductive grains should be added in order to achieve the contact of these grains with each other by applying pressure. Furthermore, this electrostatic recording film suffers from additional problems such as linear dislocation of pixels in the direction parallel to the recording electrode (hereinafter simply called "line dislocation") and an increase in enlarged pixels caused by abnormal discharge (hereinafter simply called "spotting").

Recently, JP-A-61-213851 proposes an electrostatic recording film wherein the above-mentioned disadvantages of the electrostatic recording film of JP-B-57-12144 are overcome. (The term "JP-A" as used herein means an "unexamined published Japanese patent application".) In the electrostatic recording film of JP-A-61-213851, conductive fine grains are added in such a manner that they are never contacted with each other to thereby prevent line dislocation and spotting.

Further, JP-A-57-101841 discloses the electrostatic recording film wherein the conductive fine grains are incorporated into the dielectric layer in order to improve the stability of corona discharging or recording property with high frequency.

However neither the conductive fine grains described in JP-B-57-12144 nor those described in JP-A-61-21385 can show a satisfactory reproducibility of fine lines which are the most important in drawings. Thus it has been required to overcome the problem of line cutout. Recent demand for a lower cost requires high-speed coating of an insulating layer. When the above-mentioned insulating grains comprise an inorganic substance such as calcium carbonate, the insulating grains frequently have a specific gravity of 1.0 or more. In such a case, therefore, the specific gravity of the coating solution should be elevated corresponding to the inorganic substance to thereby prevent the sedimentation of the insulating grains. The increase in the specific gravity of the coating solution results in an increase in the viscosity thereof, which makes high-speed coating impossible.

From these points of view, a polymer having a relatively low specific gravity is sometimes used as insulating grains.

However such a system would frequently suffer from the above-mentioned line cutout. Thus it has been urgently required to overcome this problem.

SUMMARY OF THE INVENTION

It is an object of the present invention to solve the above-mentioned problems without worsening spotting to thereby give an image suffering from little line cutout.

In order to achieve the above object, the present invention provides the following electrostatic recording films.

An electrostatic recording film comprising a insulating film, a conductive layer and a dielectric layer laminated in this order, wherein said dielectric layer consisting essentially of a polymer binder, insulating grains and conductive powders and said conductive powders are fibrous conductive powders.

DETAILED DESCRIPTION OF THE INVENTION

In the electrostatic recording film of the present invention, the weight ratio of the polymer binder to the fibrous conductive powder preferably ranges from 100/0.1 to 100/40.

Further, in the electrostatic recording film of the present invention, the long axis of the fibrous conductive powder is preferably ⅓ to 3 times as long as the diameter of the insulating grain and the short axis of the fibrous conductive powder is preferably not more than 0.1 times as long as the diameter of the insulating grain.

Furthermore, in the electrostatic recording film of the present invention, the insulating grains preferably comprises organic polymer grains.

Still further, the electrostatic recording film of the present invention, the back of the insulating film is preferably matted.

The polymer binder to be used in the dielectric layer of electrostatic recording film of the present invention comprises a thermoplastic resin or a hardening resin. It may be selected from various resins commonly employed as a dielectric layer of an electrostatic recording film. Examples of the thermoplastic resins include polyester, polyester amide, polyvinyl acetal, polyvinyl chloride, poly(meth)acrylate, polyamide, polyurethane, polycarbonate, polystyrene, polymethylpentene, alkyd resin, polyamide imide, silicon resin, fluorine resin, copolymers thereof and blends thereof. Examples of the hardening resins which would be hardened by heat, light or oxygen include phenol resin, melamine resin, epoxy resin, crosslinked organosilicon compound and crosslinked resin obtained, by adding a crosslinking agent to a poly(meth)acrylate polymer containing a reactive monomer. These polymer binders preferably have a volume resistance of $10^{12}$ Ω.cm or above. A volume resistance lower than the above-defined value would result in an undesirable low printing density.

As a substance to be used for the conductive powder used in the dielectric layer of the electrostatic recording film of the present invention, one having a volume resistance of $10^{-6}$ to $10^{4}$ Ω.cm is preferably used, and it may be selected from conventionally known ones as disclosed, for example, in JP-A-57-101841. Examples thereof include metals (for example, Al, Cr, Cd, Ti, Fe, Cu, In, Ni, Pd, Pt, Rh, Ag, Ru, W, Sn, Zr, In), alloys (for example, stainless, brass, Ni-Cr), metal oxides (for example, indinium oxide, tin oxide, zinc oxide, titanium oxide, vanadium oxide, ruthenium oxide, tantalum oxide), metal compounds (for example, copper iodide) and a substance whose surface is coated with one or more of these conductive substances, though the present invention is not restricted thereby.

Either one of these substances or a composition or mixture thereof may be employed. It is to be noted here, however, that these conductive powders are in the fibrous form. A preferable example of the fibrous conductive powder to be used in the dielectric layer of the electrostatic recording film of the present invention includes fibers whose surface are coated with a conductive substance (for example, a whisker of potassium titanate ($K_2O.nTiO_2$) whose surface is coated with tin oxide ($SnO_2$)).

The length of the long axis of the fibrous conductive powder ranges preferably form 1 to 45 μm, and the length of the short axis thereof ranges preferably 2 μm or less.

It is further preferable that the long axis of the fibrous conductive powder is ⅓ to 3 times as long as the diameter of the insulating grain and the short axis of the conductive powder is not more than 0.1 times as long as the diameter of the insulating grain. It is furthermore preferable that the weight ratio of the polymer binder to the conductive powder in the dielectric layer of the electrostatic recording film of the present invention ranges from 100/0.1 to 100/40.

When the conductive powder used in the dielectric layer of the electrostatic recording film of the present invention is not in the form of a long and narrow cylinder (fibrous form), the line cutout cannot be greatly improved. In order to relieve the line cutout, it is required to use a large amount of the conductive powder, which essentially causes an increase in cost, the deterioration in surface properties or the occurrence of abnormal discharge spotting which results in a serious discharge mark. An increase in the amount of the conductive powder of the above-mentioned properties is accompanied by an increase in the turbidity of the film. Therefore, such fibrous conductive powder is particularly suitable for matted electrostatic recording film which is scarcely affected by an increase in the turbidity of the film.

As the insulating grains to be used in the dielectric layer of the electrostatic recording film of the present invention, commonly known inorganic and/or organic grains having a volume resistance of $10^{8}$ Ω.cm or above, more preferably $10^{10}$ Ω.cm or above, may be employed. Examples of such inorganic grains include those made of metal oxides (for example, silicon oxide, titanium oxide, alumina, lead oxide, zirconium oxide) or salts (for example, calcium carbonate, barium titanate, barium sulfate), while examples of such organic grains include those made of styrene/divinyl benzene copolymer, melamine resin, epoxy resin, phenol resin, fluorine resin and polypropylene resin. Either one of these materials or a mixture thereof may be used as the insulating grains in the present invention.

It is preferable to use organic polymer resins as the insulating grains. In this case, a sharp distribution of uniform particle size can be easily achieved and an appropriate discharge interval can be easily obtained even in a small amount, which makes it possible to give a low turbidity of the film.

The average particle size of the above-mentioned insulating grains may be preferably selected within a range of 0.1 to 20 μm in general. The weight ratio of the polymer binder to the insulating grains may preferably range from 100/0.5 to 100/150. In the case of which the organic grains are used as the insulating grains, the weight ratio of the polymer binder to the insulating grains may preferably ranges from 100/5 to 100/60. When the weight ratio is smaller than the lower limit, the discharge becomes unstable. When it exceeds the upper limit, on the other hand, the film strength of the dielectric layer is lowered or line cutout is frequently observed. In generally, the thickness of the dielectric layer established is thinner than the particle size of the insulating grains, and the thickness of the dielectric layer, excluding the insulating grains, may preferably range from 1 to 10 μm. A thinner film would cause unstable discharge, while a thicker film would cause a low degree of resolution of the image obtained.

The dielectric layer of the electrostatic recording film of the present invention may comprise either a single layer or tow or more layers laminated on each other. Furthermore, an intermediate layer (for example, adhesive layer) may be located between the conductive layer and the dielectric layer.

The dielectric layer may further contain, for example, plasticizer, adhesion promoter, stabilizer, antioxidant, UV absorber or lubricant, if required, so long as the properties of the electrostatic recording film of the present invention are not deteriorated thereby.

In the present invention, an insulating protective layer free from any conductive powder may be located on the dielectric layer. A thinner protective layer is the more desirable. Namely, the thickness of the protective layer is preferably 5 μm or below, more preferably 1 μm or below.

The dielectric layer of the present invention may be effectively provided by a conventionally known method selected from among, for example, brushing, immersion, knife coating, roll coating, spraying, flow coating, rotational coating (spinner, wheeler).

The insulating film to be used in the present invention may comprise a commonly known insulating thermoplastic or thermosetting resin having volume resistance of $10^{12}$ Ω.cm or above. Preferable examples of the resin therefor include polyester, polyolefin, polyamide, polyester amide, polyether, polyimide, polyamide imide, polystyrene, polycarbonate, poly-p-phenylene sulfide, polyether ester, polyvinyl chloride and poly(meth)acrylate. Furthermore, copolymers, blends and crosslinked materials obtained from these resins are also available. It is preferable to orientate these resins, since the mechanical strength, dimensional stability, thermal properties and optical properties thereof can be improved thereby. Among these resins, polyester may be preferably selected. The term "polyester" as used herein means those comprising an aromatic dicarboxylic acid as the major acid component and an alkylene glycol as the major glycol component.

Examples of the aromatic dicarboxylic acid include terephthalic acid, isophthalic acid, naphthalenedicarboxylic acid, diphenoxyethanedicarboxylic acid, diphenylsulfondicarboxylic acid, diphenylketonedicarboxylic acid, anthracenedicarboxylic acid and α,β-bis(2-chlorophenoxy)-ethane-4,4'-dicarboxylic acid. Among these aromatic dicarboxylic acids, terephthalic acid is particularly preferable.

Examples of the alkylene glycol include ethylene glycol, trimethylene glycol, tetramethylene glycol, pentamethylene glycol, hexamethylene glycol and hexylene glycol.

It is needless to say that these polyesters may be either homopolyesters or copolyesters. Examples of the copolymerizable component include diol components (for example, diethylene glycol, propylene glycol, neopentyl glycol, polyalkylene glycol, p-xylilene glycol, 1,4-cyclohexane dimethanol, 5-sodium sulforesorcin); dicarboxylic acid components (for example, adipic acid, sebacic acid, phthalic acid, isophthalic acid, 2,6- naphthalene dicarboxylic acid, 5-sodiumsulfoisophthalic acid); polyfunctional dicarboxylic acid components (for example, trimellitic acid, pyromellitic acid); and oxycarboxylic acid components (for example, p-oxyethoxybenzoic acid).

The thickness of the above-mentioned plastics film may preferably range from 10 to 250 μm, more preferably from 15 to 150 μm. A film thinner than the range has a poor mechanical strength while one thicker than the range has poor running properties.

The plastic films may be subjected to a conventional surface treatment (for example, corona discharge treatment, plasma discharge treatment, anchor coating) if required, so as to improve the adhesiveness. It is advantageous, from the viewpoint of, for example, additional writing to the drawings, that the back of the insulating film is matted. The insulating film may be matted in accordance with conventional manners. For example, by dispersing an inorganic grains having a diameter of from 2 to 5 μm into the binder used in preparation of the insulating film, a matted surface which is excellent in writing property and erasing property may be obtained.

In order to prevent the occurrence of marks during running, the coefficient of static friction of the insulating film is preferably 2.0 or below, more preferably 1.0 or below.

As the conductive layer in the present invention, a commonly known one as disclosed, for example, in JP-A-63-60452 may be employed. The surface resistance thereof may preferably range from $10^4$ to $10^9$ Ω. Examples of the conductive layer include: (1) those comprising electronconductive metals or metal oxides; (2) those coated with ion-conductive polymer electrolytes; and (3) those coated with a layer comprising conductive powders and polymer electrolytes. The thickness of the conductive layer is generally 3 μm or less.

In this case, the conductive powder may be selected from among those employed in the conductive layer. Examples of the polymer electrolyte include quaternary ammonium salts, sulfonates and polyalcohols, though the present invention is not restricted thereby. Either one of these materials or a mixture thereof may be used. The conductive layer may be formed by, for example, plating, vacuum evaporation, chemical vacuum evaporation, spattering and coating.

The laminate comprising the above-mentioned insulating film and conductive layer is called a conductive film.

The electrostatic recording film of the present invention consisting of the insulating film, a conductive layer and a dielectric layer laminated in this order, wherein a specific dielectric layer is employed, makes it possible to give a clear image suffering from little line cutout. As described above, the electrostatic recording film of the present invention of the excellent properties is particularly useful as a drawing image where lines are regarded as particularly important.

To further illustrate the present invention, and not by way of limitation, the following Examples will be given wherein all parts and percentages are by weight unless otherwise specified.

EXAMPLE 1

A biaxially oriented polyethylene terephthalate film of 100 μm in thickness was subjected to glow-discharge and then coated with a solution of the following composition employed as a conductive layer followed by drying at 130° C for 10 minutes to give the conductive layer having the thickness of 0.2 to 0.3 μm:

| | |
|---|---|
| gelatin | 15 parts |
| tin oxide doped with antimony (antimony content: 5% based on tin oxide, average particle size of tin oxide: 0.2 μm) | 55 parts |
| 2,4-dichloro-hydroxy-s-triazine sodium salt | 0.03 part |
| water | 1000 parts. |

Onto the layer thus formed, a solution of the following composition was applied in such a manner as to give the thickness of the film thus formed after drying of 1.75 μm, followed by drying at 100° C. for 10 minutes. The above-mentioned thickness of 1.75 μm corresponded the thickness of a part of the dielectric layer which is free from any insulating grains.

| | |
|---|---|
| linear polyester (VYLON 2000, trade name, manufactured by Toyobo Co. Ltd.) | 37.4 parts |
| methyl ethyl ketone | 37 parts |
| toluene | 243 parts. |

To the obtained mixture of the above-mentioned components, 0.037 parts of fibrous potassium titanate coated with $SnO_2$ (DENTALL WK-200B, trade name, manufactured by Otsuka Chemical Co., Ltd., resistance: $10^{0-1}$ Ωcm, average length (long axis): 10 to 20 μm, average diameter (short axis): 0.2 to 0.5 μm) was added as the conductive powders and dispersed with a homogenizer (AM-3, trade name, manufactured by Nippon Seiki K.K.) at 10000 vpm for 10 minutes. To the obtained dispersion, 10.8 parts of a dispersion of insulating grains (20% dispersion of polypropylene (UNISTOLE R100K, trade name, manufactured by Mitsui Petrochemical Industries, Ltd., average particle size: 9.0 μm) dispersed in toluene) was added.

The electrostatic recording film thus produced was treated with an electrostatic plotter (Versatec VE3424, manufactured by Versatec Co.) and a direct-recording haze computer (manufactured by Suga Shikenki K.K.) as the manner mentioned below to evaluate the properties of the film.

EVALUATION OF PROPERTIES (1) Image properties

An electrostatic recording film produced by the manner mentioned above was treated with an electrostatic plotter (Versatec VE3424) and the obtained output is evaluated.

(i) Line cutout

In a model output pattern No. 1 involved by the electrostatic plotter (Versatec VE 3424) having a dense part and a coarse one, the number of the line cutouts in fine lines consisting of 80 μm dots in the coarse part are counted. Samples showing an average (n=3) of 4 or less are regarded as good; those having an average of 6 to 10 are regarded as somewhat good; those having an average of 11 to 15 are regarded as somewhat poor; and those having an average of 16 or more are regarded as poor.

(ii) Spotting

The evaluation is conducted with the use of the dense part in the model output pattern No. 1 involved in the hardware employed in the evaluation of line cutout. 80 fine lines of 25 mm in length are output and spots in four parts, each seemingly shows an average occurrence of spotting, are counted. The evaluation is effected based on the average of each part.

Samples showing 40 or less spots (enlarged line caused by abnormal discharge) are regarded as good; those showing 41 to 80 spots are regarded as somewhat good; those showing 81 to 160 spots are regarded as somewhat poor; and those showing 161 or more spots are regarded as poor.

(2) Haze

The turbidity of an electrostatic recording film is determined by using a direct-reading haze computer (manufactured by Suga Shikenki K.K.). Samples showing a turbidity of 12% or below are regarded as good; those showing a turbidity of 13 to 28% are regarded as somewhat good; those showing a turbidity of 29 to 40% are regarded as somewhat poor; and those showing a turbidity of 40% or above are regarded as poor.

EXAMPLE 2

The procedure of Example 1 was repeated except that the amount of the conductive powders in the dielectric layer solution was 0.37 part. The properties of the electrostatic recording film thus obtained were evaluated in the same manner as in Example 1.

EXAMPLE 3

The procedure of Example 1 was repeated except that the amount of the conductive powders in the dielectric layer solution was 3.7 parts. The properties of the electrostatic recording film thus obtained were evaluated in the same manner as in Example 1.

COMPARATIVE EXAMPLE 1

The procedure of Example 1 was repeated except that the dielectric layer solution contained no conductive powder. The properties of the electrostatic recording film thus obtained were evaluated in the same manner as in Example 1.

COMPARATIVE EXAMPLE 2

The procedure of Example 1 was repeated except that DENTALL WK-200B (0.037 part) in the dielectric layer solution was substituted with 0.037 part of $SnO_2$ fine grains of 0.1 to 4 μm in particle size as conductive powders. The properties of the electrostatic recording film thus obtained were evaluated in the same manner as in Example 1.

COMPARATIVE EXAMPLE 3

The procedure of Example 2 was repeated except that DENTALL WK-200B (0.37 part) in the dielectric layer solution was substituted with 0.37 part of the same $SnO_2$ fine grains as those employed in Comparative Example 2. The properties of the electrostatic recording film thus obtained were evaluated in the same manner as in Example 1.

COMPARATIVE EXAMPLE 4

The procedure of Example 3 was repeated except that DENTALL WK-200B (3.7 parts) in the dielectric layer solution was substituted with 3.7 parts of the same $SnO_2$ fine grains as those employed in Comparative Example 2. The properties of the electrostatic recording film thus obtained were evaluated in the same manner as in Example 1.

The properties of the electrostatic recording films obtained in the above Examples and Comparative Examples are summarized in Table 1.

In Table 1, A means good; B means somewhat good; C means somewhat poor; and D means poor. Products evaluated as A or B above are seemingly available in practical use.

TABLE 1

| | Conductive powder | Line cutout | Spotting | Haze |
|---|---|---|---|---|
| Example 1 | Fibrous Polymer binder/Conductive powders = 100/0.1 | B | B | B |
| Example 2 | Fibrous Polymer binder/Conductive powders = 100/1.0 | A | B | B |
| Example 3 | Fibrous Polymer binder/Conductive | A | B | B |

TABLE 1-continued

| | Conductive powder | Line cutout | Spotting | Haze |
|---|---|---|---|---|
| | powders = 100/10 | | | |
| Comparative Example 1 | No conductive powder | D | A | A |
| Comparative Example 2 | Conventional grain Polymer binder/Conductive powders = 100/0.1 | D to C | A | A |
| Comparative Example 3 | Conventional grain Polymer binder/Conductive powders = 100/1.0 | C | A | A |
| Comparative Example 4 | Conventional grain Polymer binder/Conductive powders = 100/10 | C | A | A |

While the invention has been described in detail and with reference to specific examples thereof, it will be apparent to one skilled in the art that various changes and modifications can be made therein without departing from the spirit and scope thereof.

What is claimed is:

1. An electrostatic recording film comprising an insulating film, a conductive layer and a dielectric layer laminated in this order, wherein said dielectric layer consists essentially of a polymer binder comprised of a thermoplastic resin or a hardening resin having a volume resistance of $10^{12}$ Ω.cm or above, insulating grains having a volume resistance of $10^8$ Ω.cm or above and conductive powders, and wherein said conductive powders are fibrous conductive powders, and the thickness of the dielectric layer, excluding the insulating grains, is from 1 to 10 $\mu$m.

2. An electrostatic recording film as claimed in claim 1, wherein the weight ratio of said polymer binder to said fibrous conductive powder ranges from 100/0.1 to 100/40.

3. An electrostatic recording film as claimed in claim 1, wherein the long axis of said conductive fiber is $\frac{1}{3}$ to 3 times as long as the diameter of said insulating grain and the short axis of said fibrous conductive powder is not more than 0.1 times as long as the diameter of said insulating grain.

4. An electrostatic recording film as claimed in claim 1, wherein said insulating grains comprises organic polymer grains.

5. An electrostatic recording film as claimed in claim 1, wherein the back of said insulating film is matted.

* * * * *